(12) United States Patent
Yousef

(10) Patent No.: US 7,899,140 B2
(45) Date of Patent: Mar. 1, 2011

(54) SCATTERED PILOT CORRELATION IN DVB-H SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 649 days.

(21) Appl. No.: 11/957,716

(22) Filed: Dec. 17, 2007

(65) Prior Publication Data

US 2009/0154547 A1 Jun. 18, 2009

(51) Int. Cl.
*H04L 27/06* (2006.01)
(52) U.S. Cl. ......................................... 375/343; 375/260
(58) Field of Classification Search .................. 375/343, 375/150, 240.01, 260; 370/203
See application file for complete search history.

(56) References Cited

U.S. PATENT DOCUMENTS

| 7,436,757 | B1 * | 10/2008 | Wilson et al. | 370/203 |
| 7,466,778 | B2 * | 12/2008 | Ananth et al. | 375/347 |
| 2006/0088133 | A1 * | 4/2006 | Chen et al. | 375/343 |
| 2008/0123758 | A1 * | 5/2008 | Paik et al. | 375/260 |

OTHER PUBLICATIONS

Schwoerer, L., "Fast Pilot Synchronization Schemes For DVB-H," Proceedings of the 4th IASTED International Multi-Conference, Wireless and Optical Communications, Jul. 8-10, 2004, Banff, Canada, pp. 420-424.

* cited by examiner

*Primary Examiner* — Temesghen Ghebretinsae
(74) *Attorney, Agent, or Firm* — Rahman LLC

(57) ABSTRACT

A method for correlating scattered pilot locations in a sequence of OFDM symbols in a multi-carrier transmission system, and includes mapping pilot locations comprising pilot symbols having predetermined known values, wherein the pilot symbols are positioned among data subcarriers in time and frequency dimensions consisting of received pilot symbols and having a predetermined position pattern in the time and frequency dimensions, wherein the predetermined position pattern comprises a finite number of sub-position patterns each corresponding to positions of the pilot symbols; estimating a Doppler spread in a frequency spectrum between the transmitter and the receiver in the multi-carrier transmission system; estimating a channel length of a set of channel paths received at the receiver; and the receiver automatically selecting one of a plurality of predetermined methods of correlating the scattered pilot locations in the sequence of OFDM symbols based only on the estimating processes.

15 Claims, 17 Drawing Sheets

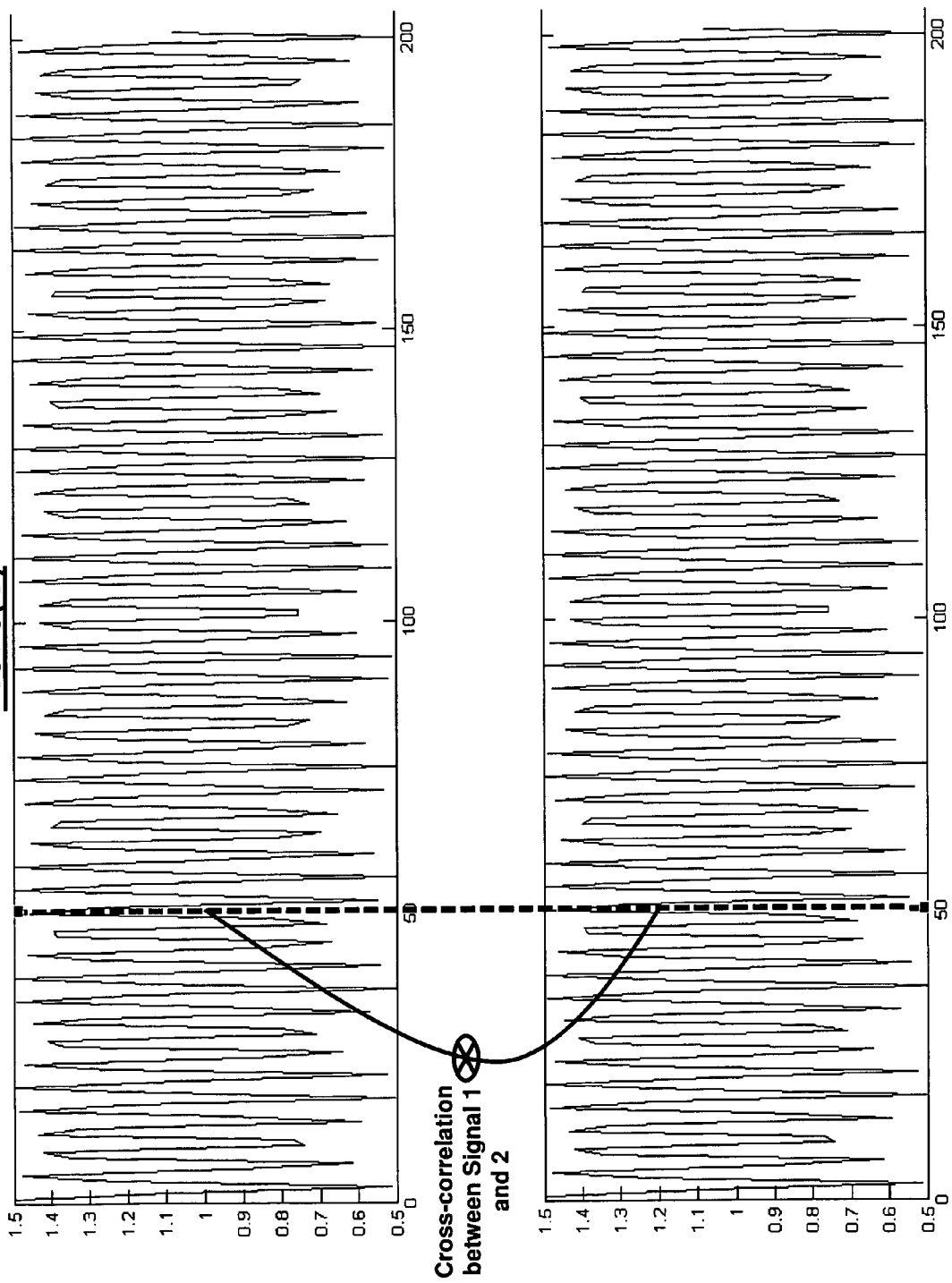

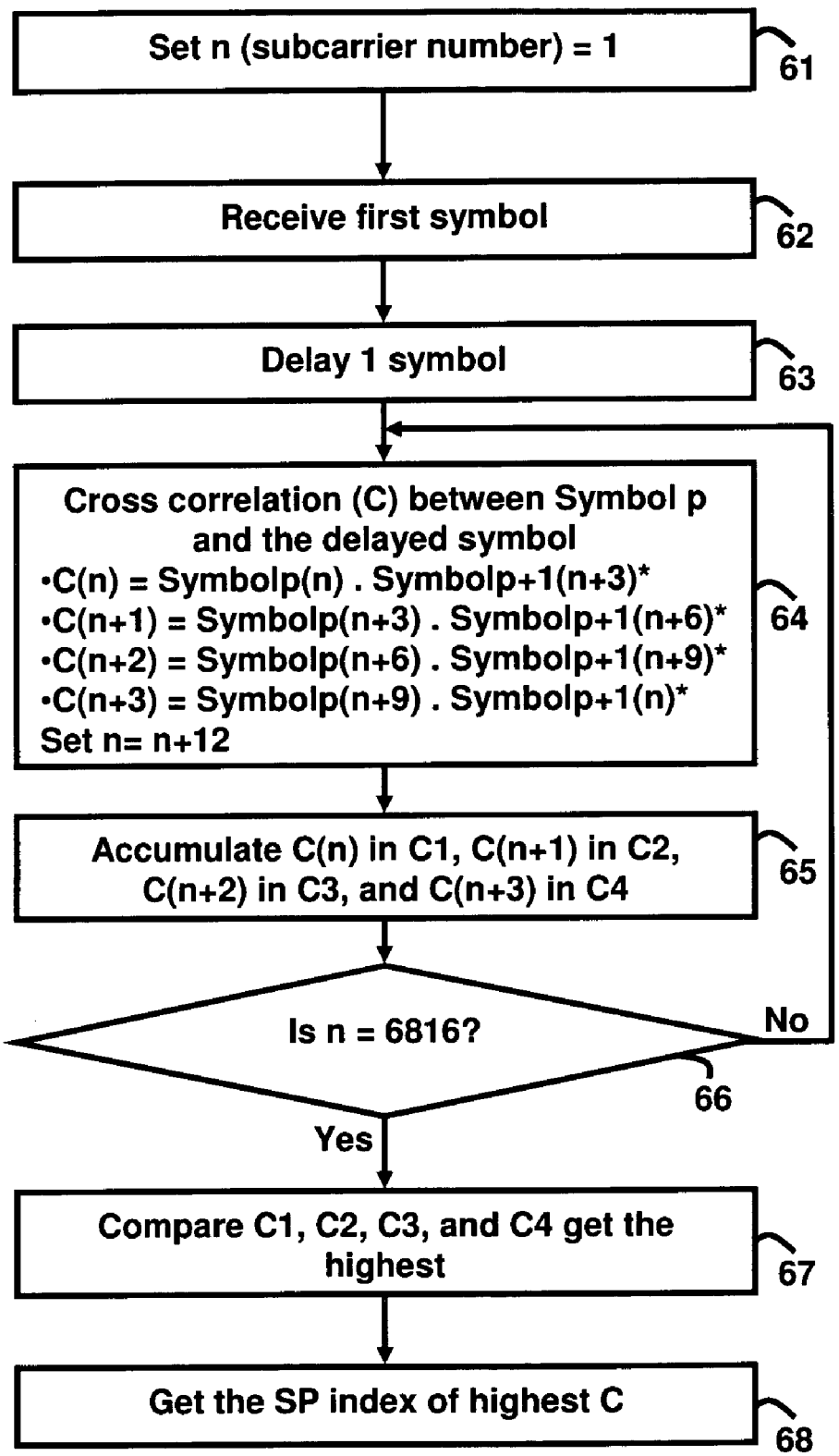

Frequency Domain

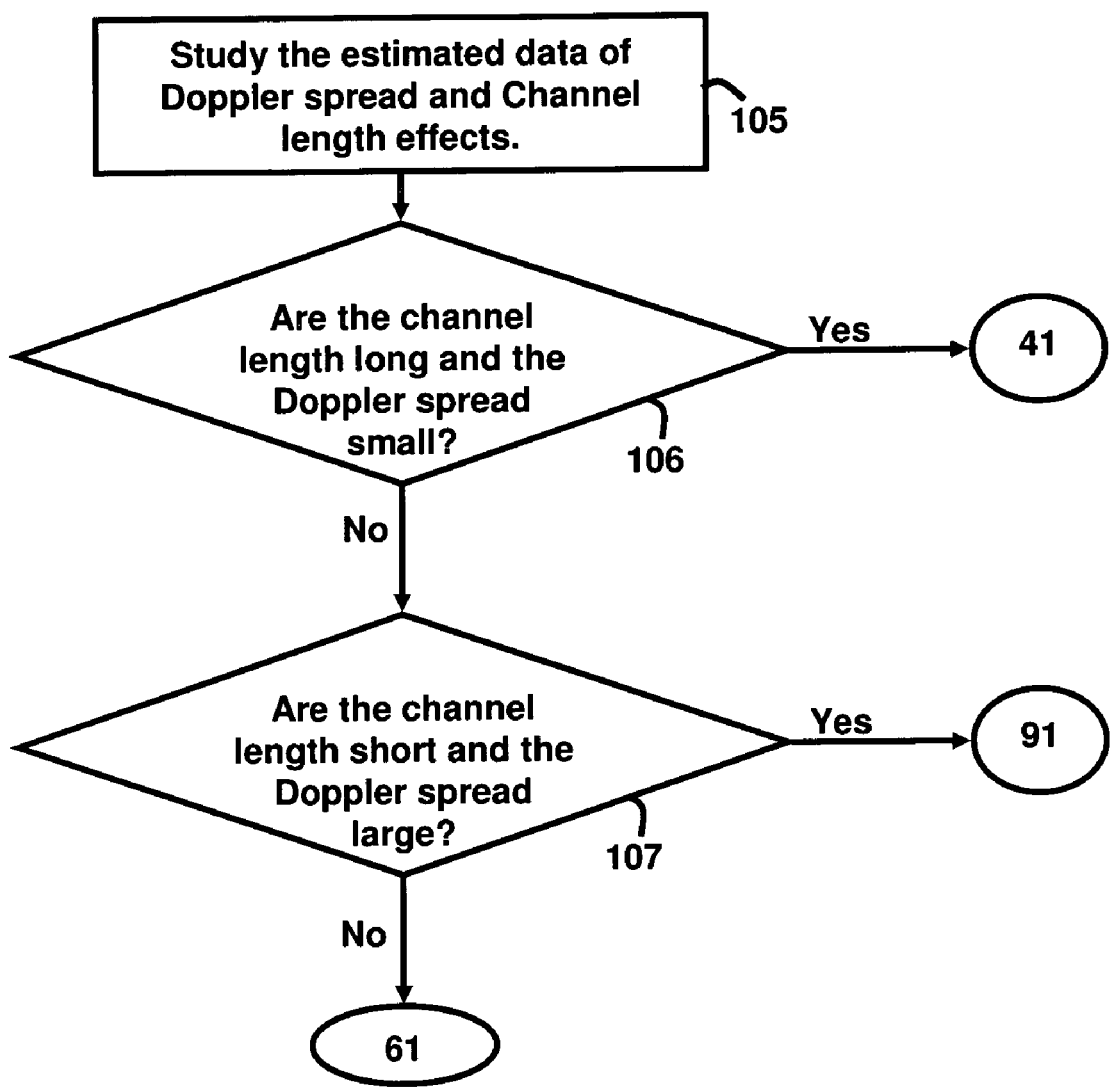

SCATTERED PILOT CORRELATION IN DVB-H SYSTEMS

BACKGROUND

1. Technical Field

The embodiments herein generally relate to mobile television (TV) technologies, and, more particularly, to pilot-aided orthogonal-frequency-division-multiplexing (OFDM) systems used in Digital Video Broadcasting-Handheld (DVB-H) systems.

2. Description of the Related Art

Frequency division multiplexed communications systems transmit upwards of thousands of carrier signals simultaneously to communicate information. In the case of OFDM systems the transmitted carrier signals are orthogonal to each other to avoid or minimize mutual interference. In an OFDM system, each transmitted carrier signal may be used to transmit a different unit of data (e.g., symbol) in parallel. In pilot-aided OFDM systems, carriers of the OFDM symbol are modulated, at the transmitter, with data symbols in addition to pilot symbols known to both the transmitter and the receiver. DVB-H is a pilot-aided OFDM system. A subset of the carriers in the OFDM symbol carry pilot symbols known to the receiver in order to be used for channel estimation and correction. The carriers dedicated to the pilot symbols are known as the pilots.

There are two types of pilots, namely, continuous pilots (CP) and scattered pilots (SP). At the receiver, these pilots are used to estimate the channel at the corresponding carrier positions. The pilot positions are not necessarily fixed from one OFDM symbol to another. If the pilot position is fixed across the OFDM symbols, it is called a continuous pilot; if it is variable, it is called a scattered pilot. The continuous pilots occupy fixed locations in the OFDM symbol while the scattered pilots occupy one of four groups of locations depending on the OFDM symbol number. In order to recover the entire channel (all the carriers) from the estimated carriers at the pilot positions, the estimated carriers are interpolated to obtain the entire channel.

In order to estimate the channel (i.e., estimate the channel length, which is the time between arrival of the first and last channel paths at the receiver), the received signal (after taking the Fast Fourier Transform (FFT)) is divided by the pilot symbols at the pilot locations. This gives an initial estimate of the channel at these locations which is then interpolated to obtain the channel at all the active carrier locations. Then, channel correction is performed and a soft estimate of the data can be obtained.

Generally, during channel estimation, perfect knowledge of the scattered pilot locations (i.e., perfect knowledge of the OFDM symbol number) is crucial to the success of the estimation. In practical receivers where time slicing is applied, an offset in symbol number tracking is possible. This results in a wrong estimation of the scattered pilot locations. In order to overcome this problem, a scattered pilot location detection technique is needed which does not depend on the receiver tracking of the OFDM symbol number.

SUMMARY

In view of the foregoing, an embodiment provides a method for correlating scattered pilot locations in a sequence of orthogonal-frequency-division-multiplexing (OFDM) symbols transmitted by a transmitter and received by a receiver in a multi-carrier transmission system, the OFDM symbols comprising continuous pilot symbols and scattered pilot symbols, wherein the method comprises mapping pilot locations comprising pilot symbols having predetermined known values, wherein the pilot symbols are positioned among data subcarriers in time and frequency dimensions consisting of received pilot symbols and having a predetermined position pattern in the time and frequency dimensions, wherein the predetermined position pattern comprises a finite number of sub-position patterns each corresponding to positions of the pilot symbols; estimating a Doppler spread in a frequency spectrum between the transmitter and the receiver in the multi-carrier transmission system; estimating a channel length of a set of channel paths received at the receiver; and the receiver automatically selecting one of a plurality of predetermined methods of correlating the scattered pilot locations in the sequence of OFDM symbols based only on the estimating processes.

In one embodiment, the selecting process comprises grouping a range of all pilot symbols located in a single subcarrier corresponding to a dynamic time dimension and a single frequency dimension, wherein the range comprises all pilot symbols located between and including a first received scattered pilot symbol and a last received scattered pilot symbol received in a single subcarrier; buffering the range of all pilot symbols located in a single subcarrier; disregarding a change in subcarrier values across the range of all pilot symbols located in a single subcarrier; creating a graphical pilot correlation sequence corresponding to the buffered range of all pilot symbols located in a single subcarrier; locating peaks in the pilot correlation sequence; and identifying the peaks as scattered pilot symbol locations. Preferably, the multi-carrier transmission system comprises a DVB-H system. The range of all pilot symbols located in a single subcarrier may equal four pilot symbols. Preferably, the OFDM symbols are received in a slow fading channel. Also, the buffering of the range of all pilot symbols located in a single subcarrier preferably comprises buffering four received OFDM symbols.

In another embodiment, the selecting process comprises grouping a range of all occurrences of the same pilot symbol located across multiple subcarriers corresponding to a single time dimension and multiple frequency dimensions, wherein the range comprises all occurrences of the same pilot symbol located between and including a first received scattered pilot symbol and a second received scattered pilot symbol received across multiple subcarriers; creating a graphical pilot correlation sequence corresponding to the grouped range of all occurrences of the same pilot symbol located across multiple subcarriers; locating peaks in the pilot correlation sequence; and identifying the peaks as scattered pilot symbol locations. Preferably, the range of all occurrences of the same pilot symbol located across multiple subcarriers equals twelve pilot symbols. Moreover, the OFDM symbols are preferably received in a flat frequency channel. Furthermore, the flat frequency channel may comprise an additive white Gaussian noise (AWGN) channel. Additionally, amplitudes of the peaks may be a function of a flatness of a frequency of the channel.

In another embodiment, the selecting process comprises grouping a range of all pilot symbols located in multiple subcarriers and in adjacent received OFDM symbols corresponding to multiple time dimensions and multiple frequency dimensions, wherein the range comprises all pilot symbols located between and including a first received scattered pilot symbol and a second received scattered pilot symbol received in across multiple subcarriers and the adjacent received OFDM symbols in the time dimension; creating a graphical pilot correlation sequence corresponding to the grouped range of located in multiple subcarriers and in adjacent received OFDM symbols; locating peaks in the pilot correlation sequence; and identifying the peaks as scattered pilot symbol locations. Preferably, a difference in time of the pilot symbols in the range equals one OFDM symbol. Furthermore, a difference in frequency of the pilot symbols in the range may equal three subcarriers. Also, the OFDM symbols are preferably received in a frequency-selective channel. Moreover, the OFDM symbols may be received in a fast fading channel. Alternatively, the OFDM symbols may be received in a slow fading channel. Still alternatively, the OFDM symbols may be received in a flat frequency channel. Preferably, the flat frequency channel comprises an AWGN channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3(C) is a graphical representation illustrating the cross-correlation between the signal of FIG. 3(A) and the signal of FIG. 3(B) in the frequency domain;

FIGS. 6(A) and 6(B) are flow diagrams illustrating a method of cross-correlation according to a second embodiment herein;

FIG. 12 illustrates a flow diagram illustrating a preferred method according to the embodiments herein.

DETAILED DESCRIPTION OF PREFERRED EMBODIMENTS

Figure 1:
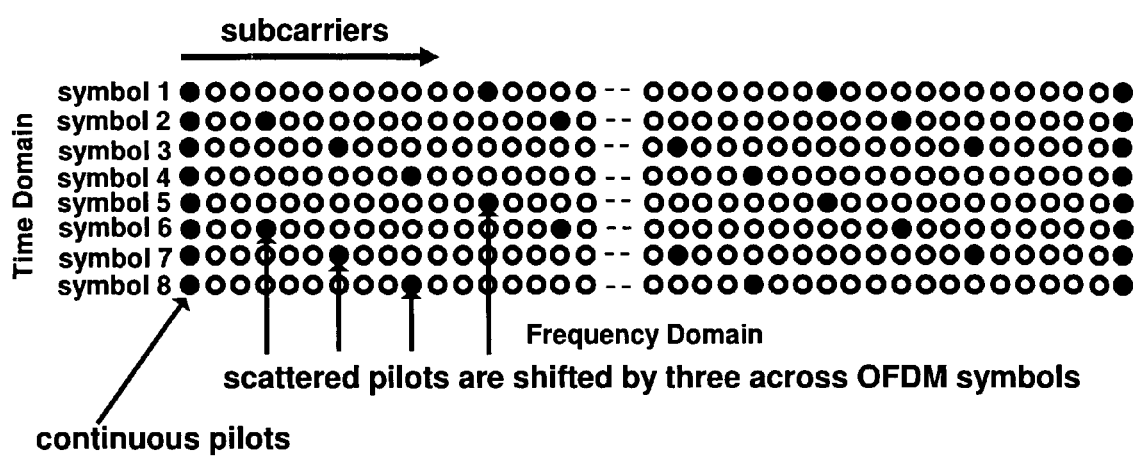
FIG. 1 illustrates a schematic diagram of a pilot-aided OFDM symbol structure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a scattered pilot location detection technique, which does not depend on the receiver tracking of the OFDM symbol number. The embodiments herein achieve this by providing scattered pilot correlation in the time domain only, in the frequency domain only, and in both the time and frequency domains. Referring now to the drawings, and more particularly to FIGS. 1 through 12, where similar reference characters denote corresponding features consistently throughout the figures, there are shown preferred embodiments.

FIG. 1 shows an example of an OFDM symbol structure where there are both continuous and scattered pilots. For illustrative purposes the scattered pilot locations that are shown in FIG. 1 are the same in FIGS. 2, 5, and 7 as well. The scattered pilot location pattern repeats every four OFDM symbols. A correlation set may be derived as described in Schwoerer, L., "Fast Pilot Synchronization Schemes for DVB-H," Proc. Wireless and Optical Communications, Banff, Canada, Jul. 8-10, 2004, pp. 420-424, the complete disclosure of which, in its entirety, is herein incorporated by reference.

Figure 2:
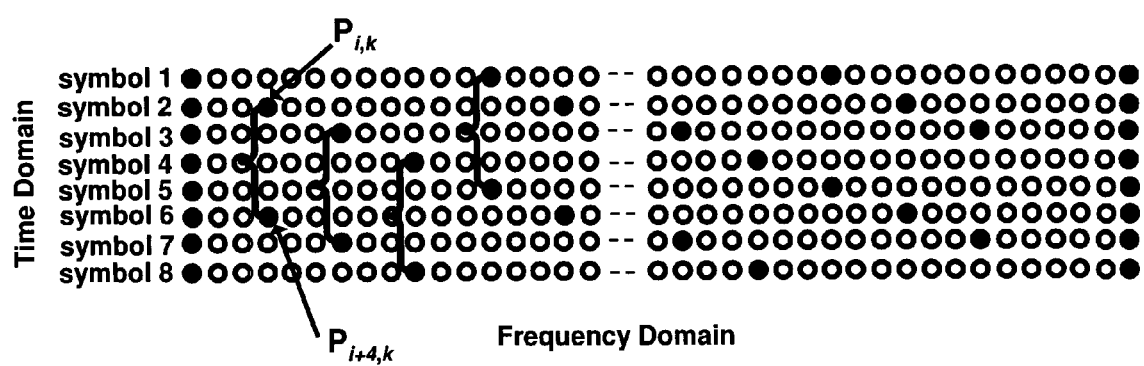
FIG. 2 illustrates a schematic diagram of a time correlation technique to achieve scattered pilot correlation of OFDM data symbols.

According to a first embodiment, scattered pilot correlation may occur only in the time domain (across OFDM symbols). In other words, as illustrated in FIG. 2, the correlation occurs vertically. One way to detect the scattered pilot locations is to cross-correlate the two OFDM symbols with indices i and i+4 (i.e., OFDM symbols $P_{i,k}$ and $P_{i+4,k}$). If P(i,k) is a given symbol, where i is the symbol index and k is the subcarrier number, then the cross-correlation equation is $$C(i) = \left| \sum_{0}^{Kmax} P(i, k) \cdot P^*(i + 4, k) \right|,$$

the maximum values of C(i) occurs if two terms of the cross-correlation are equal, which occurs at indices of scattered pilots, thus their location is detected.

If the channel is slow fading, the change in the subcarrier across four symbols can be ignored and the correlation sequence has peaks at the scattered pilot locations. In this context, a slow fading channel stays the same over the entire time-scale of communication. Slow fading arises when the coherence time of the channel (a measure of the minimum time required for the magnitude change of a channel) is large relative to the OFDM symbol duration. In this regime, the amplitude and phase change imposed by the channel can be considered roughly constant over consecutive symbols. For example, consider two signals (Signal 1 and Signal 2). FIG.

Figure 3A:
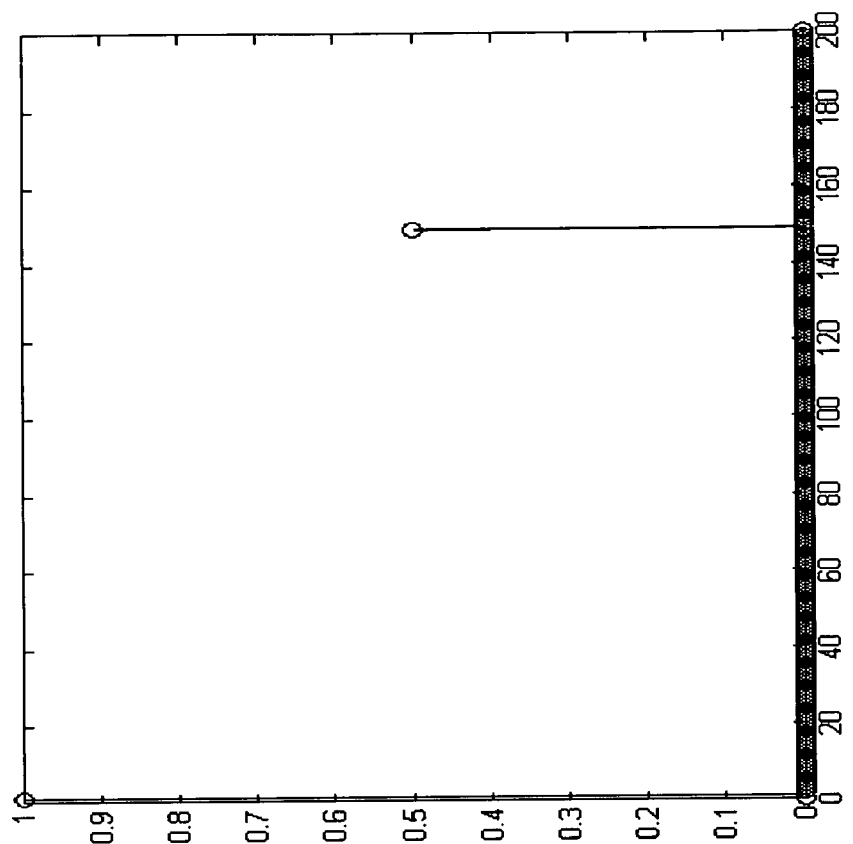
FIG. 3(A) is a graphical representation a long channel response in the time domain.
Figure 3B:
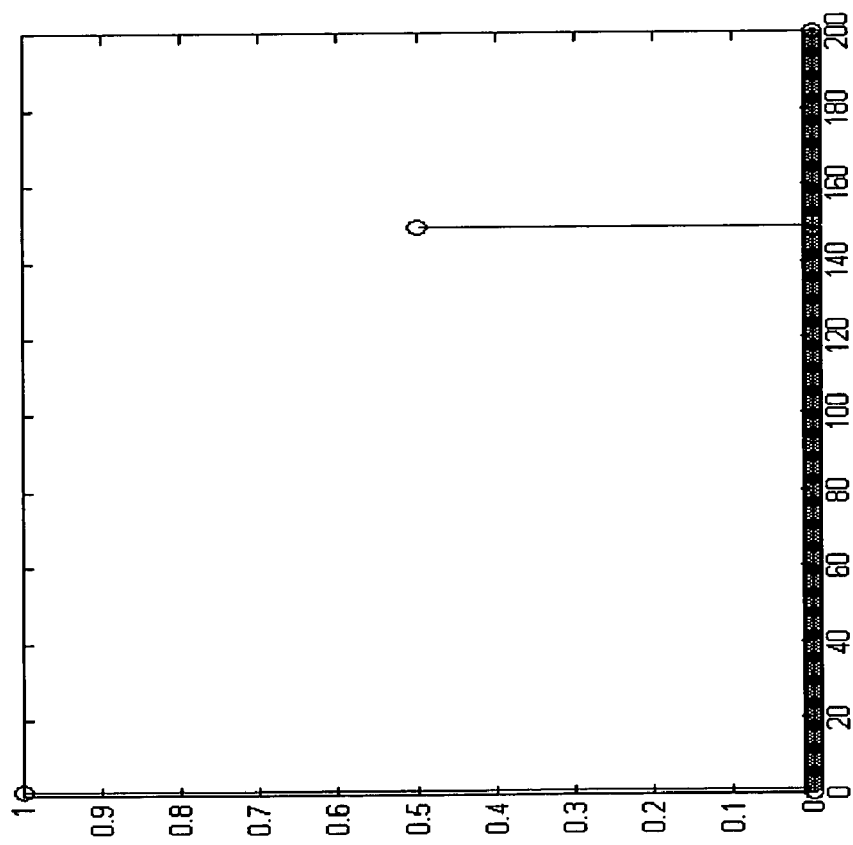
FIG. 3(B) is a graphical representation illustrating a time domain response of the same channel of FIG. 3(A) after some delay.

3(A) illustrates Signal 1 of a long channel response. FIG. 3(B) illustrates Signal 2 of the long channel response after some delay. FIG. 3(C) illustrates the cross-correlation between Signal 1 and 2. It is evident from FIGS. 3(A) through 3(C) that the channel effects are nearly the same in the two OFDM symbols, thus the process is effective as the scattered pilot pattern is substantially the same across consecutive OFDM symbols.

This technique is easy to implement and has good performance in slow fading channels. The ease of implementation comes from the fact that only a simple cross-correlation operation is performed. Furthermore, only four OFDM symbols need to be buffered to facilitate the approach provided by the embodiments herein. The technique utilizes buffering of four received OFDM symbols and results in a four-symbol delay, whereby a buffer (not shown) is used to temporarily hold symbols n, n+1, n+2, n+3 until symbol n+4 arrives. At this instance, the cross-correlation can be performed. Thus, a buffer of four OFDM symbols is used.

Figure 4A:
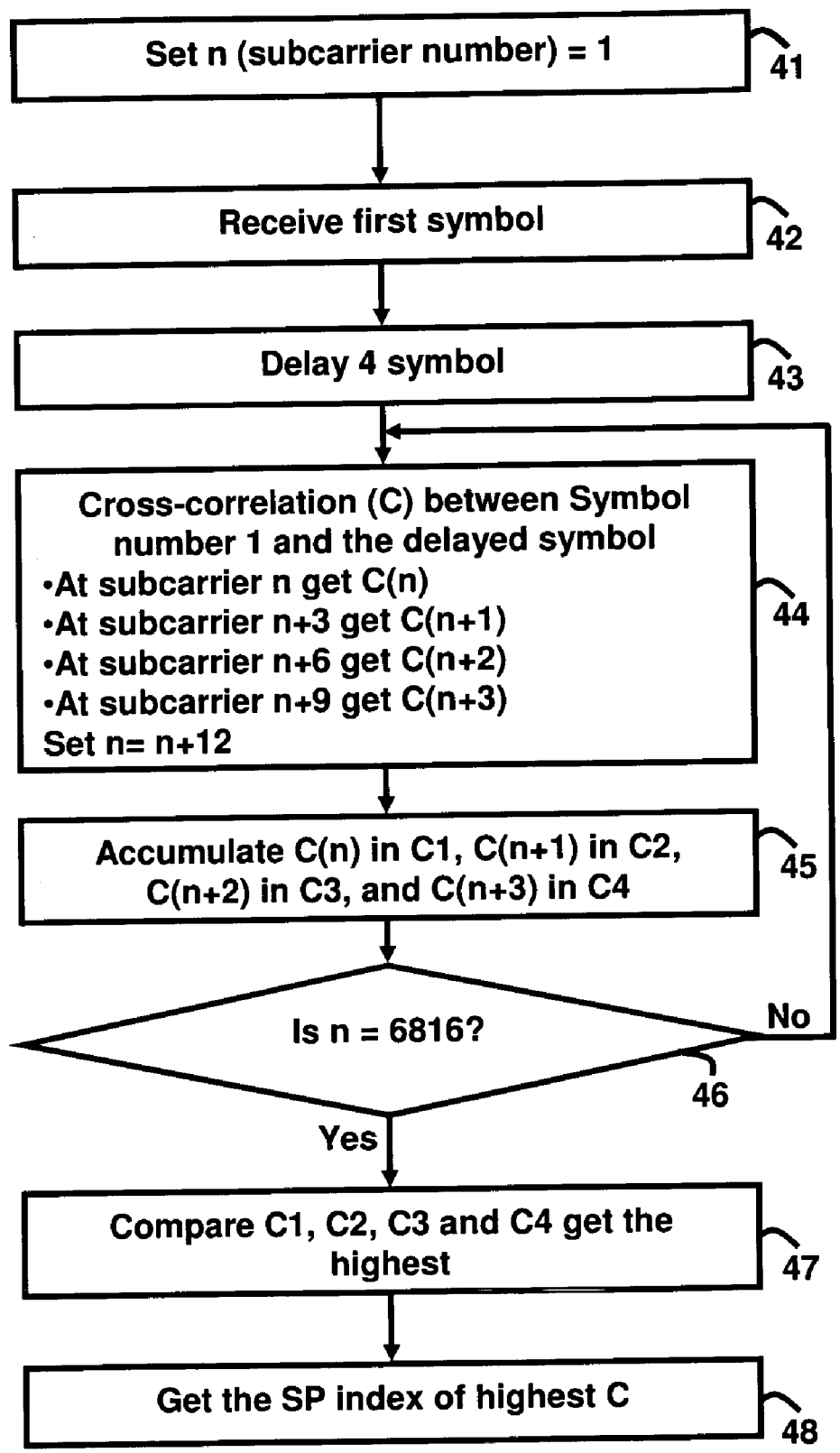
FIGS. 4(A) and 4(B) are flow diagrams illustrating a method of cross-correlation according to a first embodiment herein.
Figure 4B:
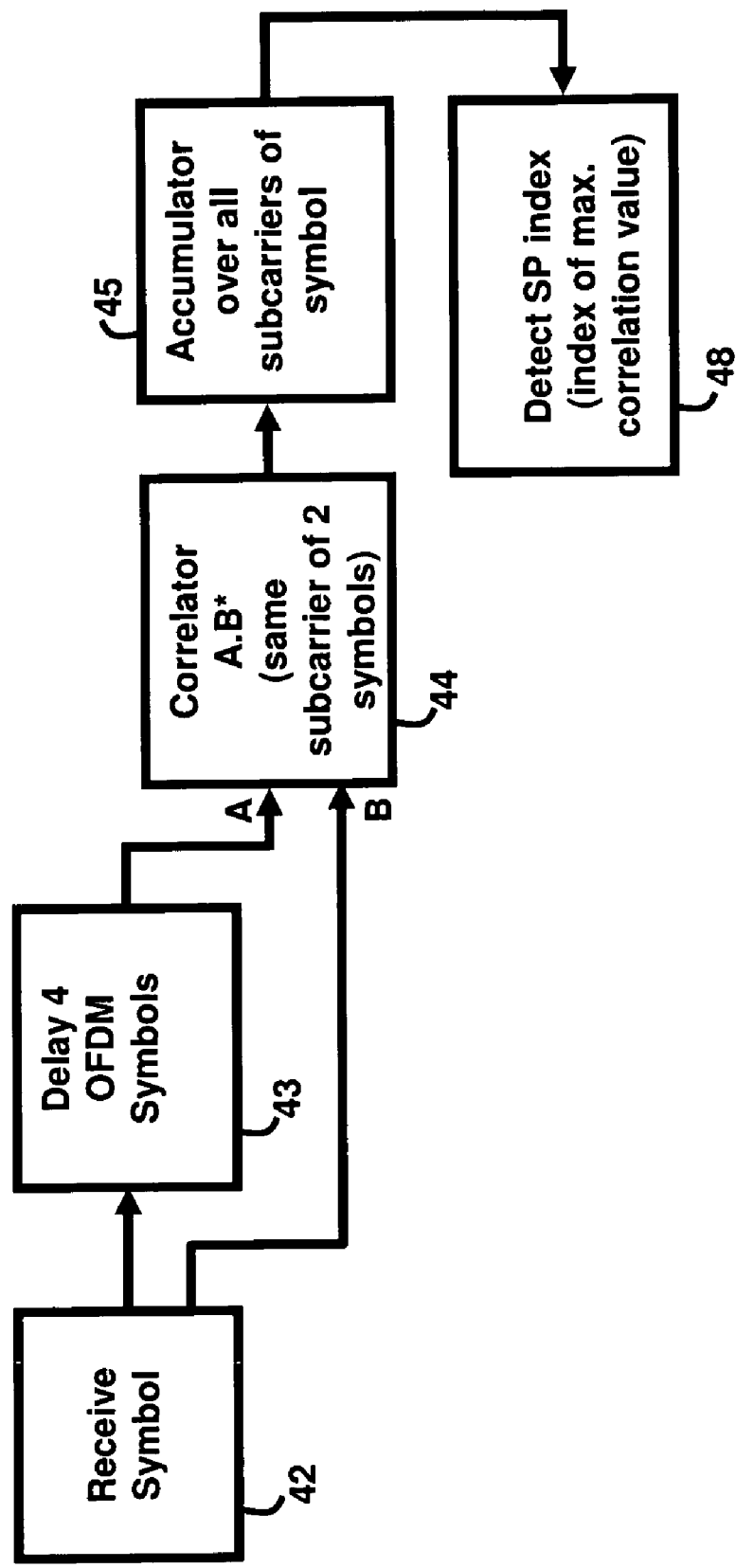

A cross-correlation technique according to the first embodiment herein is illustrated in the flowcharts of FIGS. 4(A) and 4(B). First, the subcarrier number, n, is set (41) equal to 1. Next, a first symbol is received (42). Then, a delay (43) of four symbols occurs. Upon completion of this step, a cross-correlation (C) between the Symbol 1 number and the delayed symbol occurs (44). More particularly, the process (44) comprises: at subcarrier n get C(n), at subcarrier n+3 get C(n+1), at subcarrier n+6 get C(n+2), at subcarrier n+9 get C(n+3), set n=n+12. Thereafter, the process involves accumulating (45) C(n) in C1, C(n+1) in C2, C(n+2) in C3, and C(n+3) in C4. Next, it is determined (46) whether n=6816. If it is not (No), then the process reverts back to step (44). If it is equal to 6816 (maximum number of subcarriers within a symbol) (Yes), then C1, C2, C3, and C4 are compared (47) to get the highest value. Finally, the scattered pilot index of the highest C value is selected (48).

Figure 5:
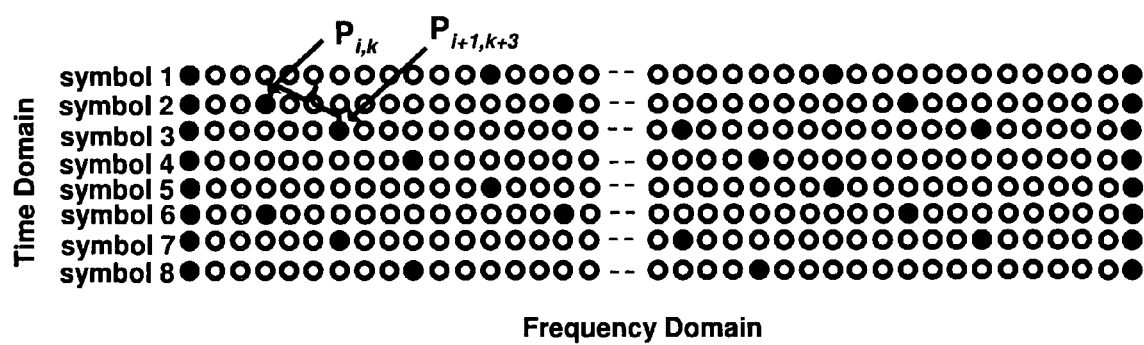
FIG. 5 illustrates a schematic diagram of a time-frequency correlation technique to achieve scattered pilot correlation of OFDM data symbols according to an embodiment herein.

Additionally, in a second embodiment, as shown in FIG. 5, the scattered pilot correlation may occur in both the time and frequency domains (across OFDM symbols and subcarriers). In other words, in FIG. 5, the correlation occurs diagonally. This technique uses one OFDM symbol buffer. The correlation occurs between current symbol and the next one; only one symbol is buffered thus its delay is small compared to the first method shown in FIG. 4. The OFDM symbol is cross-correlated with the next symbol. If P(i,k) is a given symbol, where i is the symbol index and k is the subcarrier number, then the cross-correlation equation is $$C(i) = \left| \sum_{0}^{Kmax} P(i,k) \cdot P^*(i+1, k+3) \right|,$$

the maximum values of C(i) occurs if two terms of the cross-correlation are equal, which occurs at indices of the scattered pilots, thus their location is detected.

The difference in time is only one symbol (as compared to four symbols in the first embodiment) and the difference in subcarriers is only three subcarriers (as compared to twelve subcarriers in the Third embodiment) (i.e., OFDM symbols $P_{i,k}$ and $P_{i+1,k+3}$). This results in the second embodiment being more robust in case of moderate levels of frequency-selective and/or fast-fading channel. In this context, a fast fading channel varies significantly over the time-scale of communication.

Figure 6B:
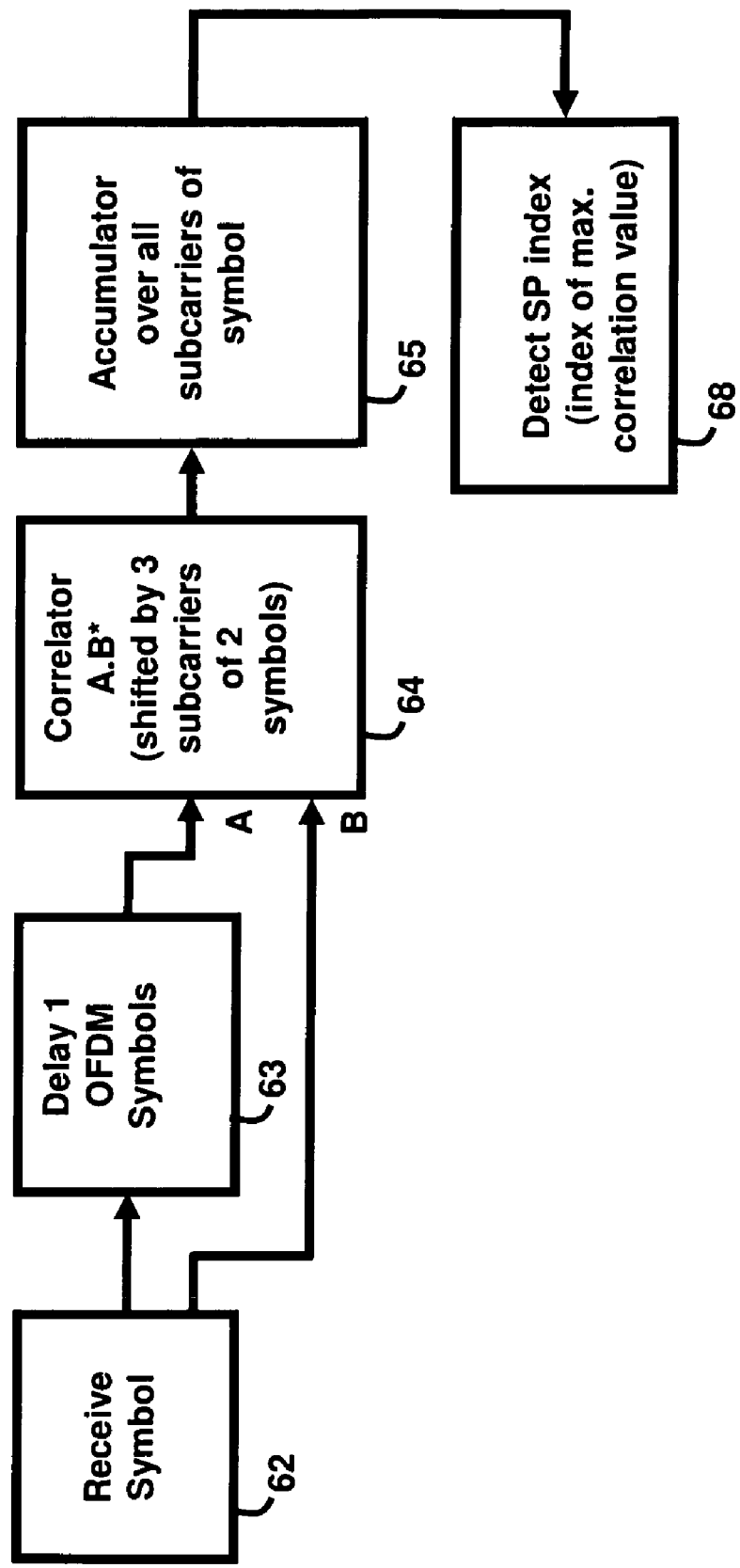

The cross-correlation technique according to the second embodiment herein is illustrated in the flowcharts of FIGS. 6(A) and 6(B). First, the subcarrier number, n, is set (61) equal to 1. Next, a first symbol is received (62). Then, a delay (63) of one symbol occurs. Upon completion of this step, a cross-correlation (C) between the Symbol 1 number and the delayed symbol occurs (64). More particularly, the process (64) comprises: C(n) Symbol$_p$(n), Symbol$_{p+1}$(n+3)*; C(n+1) =Symbol$_p$(n+3), Symbol$_{p+1}$(n+6)*; C(n+2)=Symbol$_p$(n+6), Symbol$_{p+1}$(n+9)*; C(n+3)=Symbol$_p$(n+9), Symbol$_{p+1}$(n)*; Set n=n+12. Thereafter, the process involves accumulating (65) C(n) in C1, C(n+1) in C2, C(n+2) in C3, and C(n+3) in C4. Next, it is determined (66) whether n=6816. If it is not (No), then the process reverts back to step (64). If it is equal to 6816 (Yes), then C1, C2, C3, and C4 are compared (67) to get the highest value. Finally, the scattered pilot index of the highest C value is selected (68).

Figure 7:
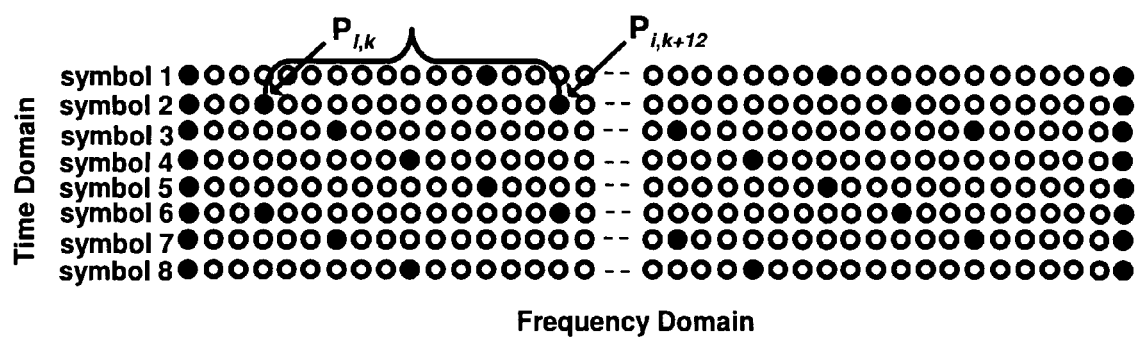
FIG. 7 illustrates a schematic diagram of a frequency correlation technique to achieve scattered pilot correlation of OFDM data symbols according to an embodiment herein.

According to a third embodiment, as shown in FIG. 7, the scattered pilot correlation occurs only in the frequency domain (across subcarriers). In other words, in FIG. 7, the correlation occurs horizontally. For the same OFDM symbol, autocorrelation of the OFDM symbol results in peaks at the scattered pilot locations. One way to detect the scattered pilot locations is to cross-correlate the two OFDM symbols with indices k and k+12 (i.e., OFDM symbols $P_{i,k}$ and $P_{i,k+12}$). The amplitudes of these peaks depend on how flat the channel is in frequency. For flat frequency channels (e.g., ideal or AWGN channels), the autocorrelation gives high peaks at the scattered pilot locations and the location detection technique is reliable. If P(i,k) is a given symbol, where i is the symbol index and k is the subcarrier number, then the cross-correlation equation is $$C(i) = \left| \sum_{0}^{Kmax} P(i,k) \cdot P^*(i, k+12) \right|,$$

the maximum values of C(i) occurs if two terms of the cross-correlation are equal which occurs at indices of the scattered pilots, thus their location is detected.

Figure 8A:
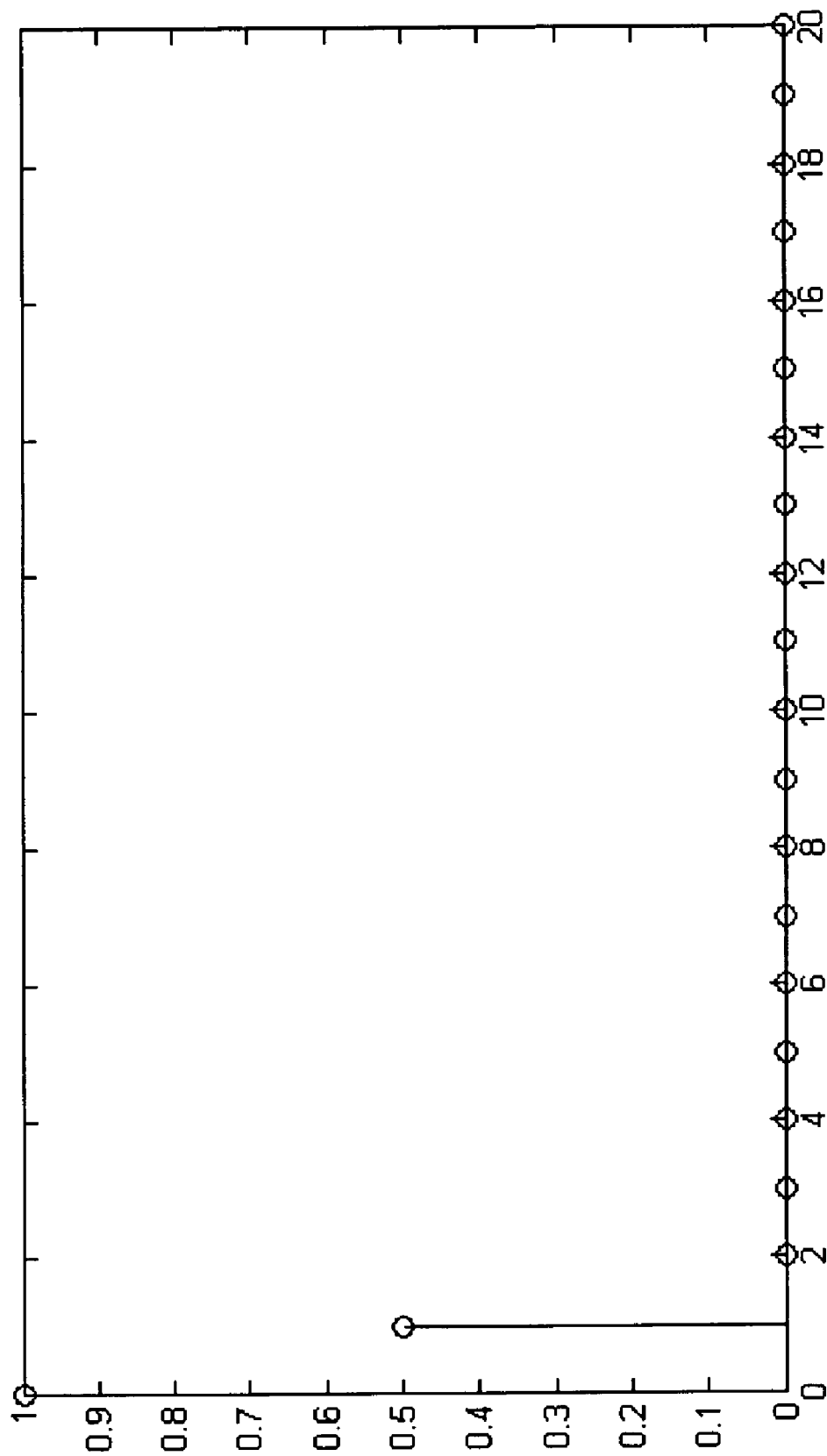
FIG. 8(A) is a graphical representation illustrating a short channel response in the time domain.
Figure 8B:
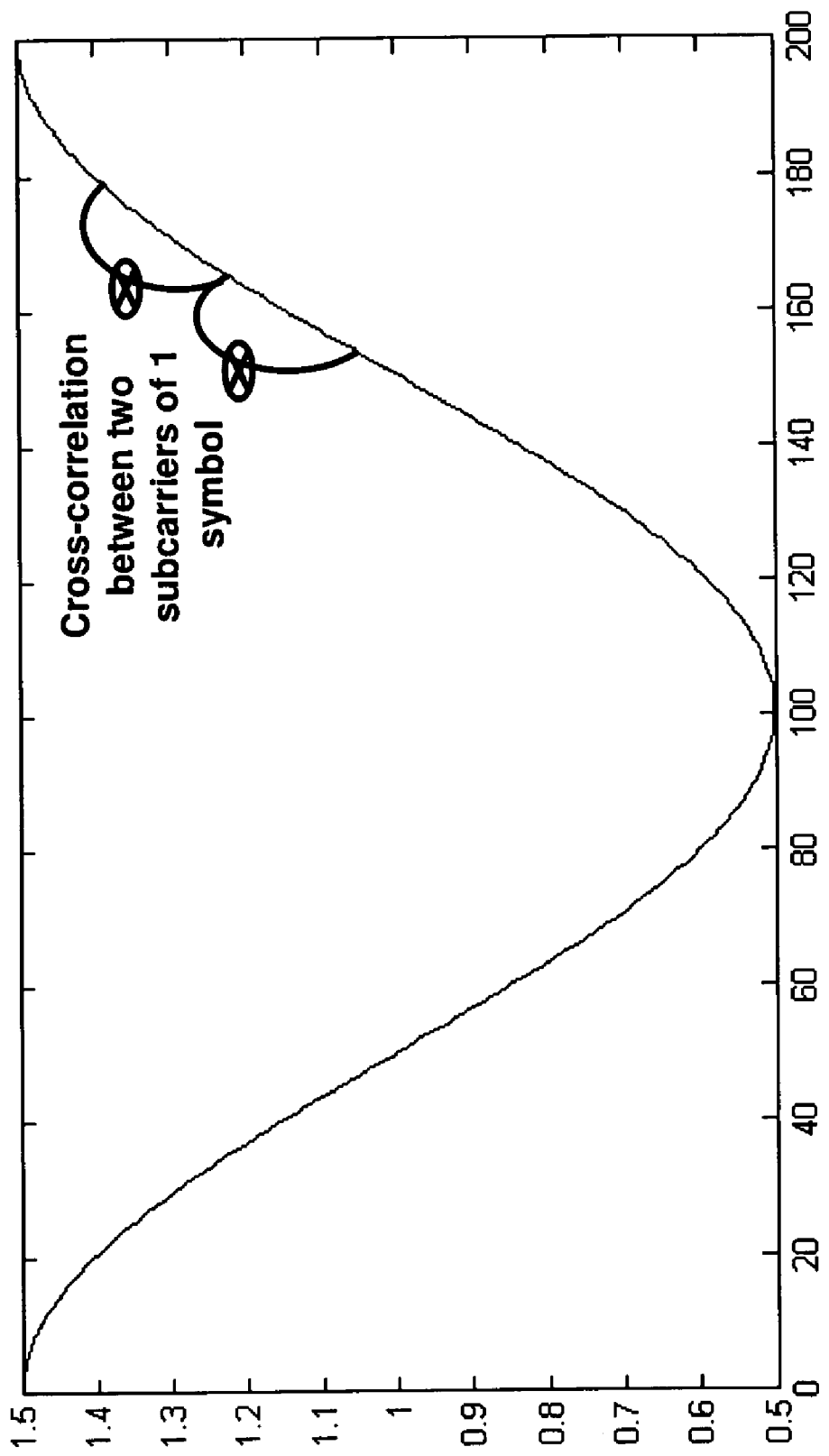
FIG. 8(B) is a graphical representation illustrating the cross-correlation between two subcarriers across the same symbol after a short channel of the response of FIG. 8(A)

This technique is easy to implement and has good performance in flat channels. In case of moderate Doppler and moderate channel length, the variations in both directions (time and frequency are not rather large. Furthermore, this technique does not require buffering and does not result in delay. This technique uses cross-correlation between two samples in one symbol; i.e., two different subcarriers of the same symbol; thus no symbol buffering is needed. For a short channel (fast fading) the echo of received signal comes early as shown in FIG. 8(A) and by taking the FFT of this response to get the channel response, as shown in FIG. 8(B), from which it is deduced that the change in the channel response is quite slow therefore cross-correlation between two subcarriers across the same symbol is demonstrated to be effective.

Figure 9A:
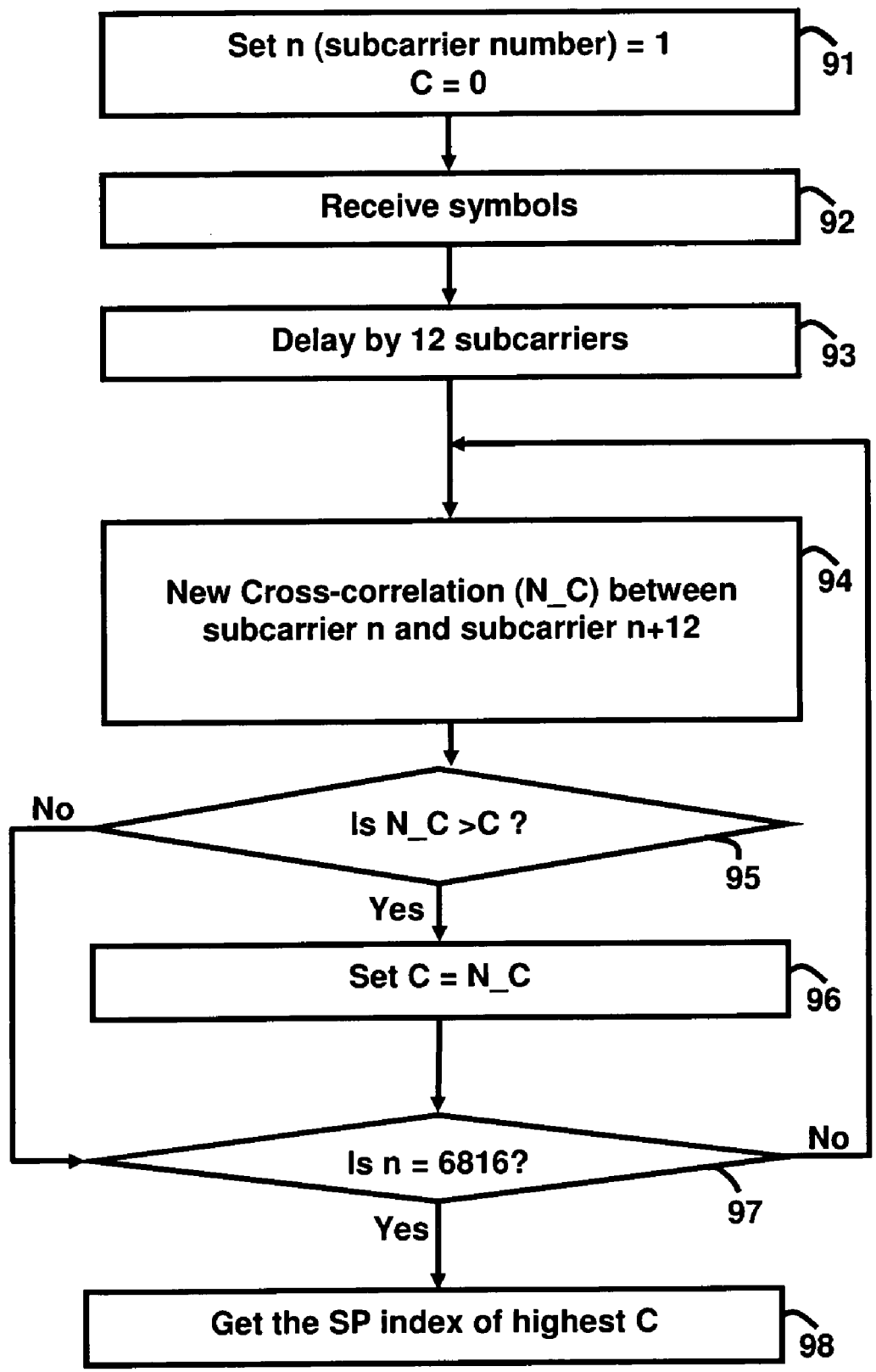
FIGS. 9(A) and 9(B) are flow diagrams illustrating a method of cross-correlation according to a third embodiment herein.
Figure 9B:
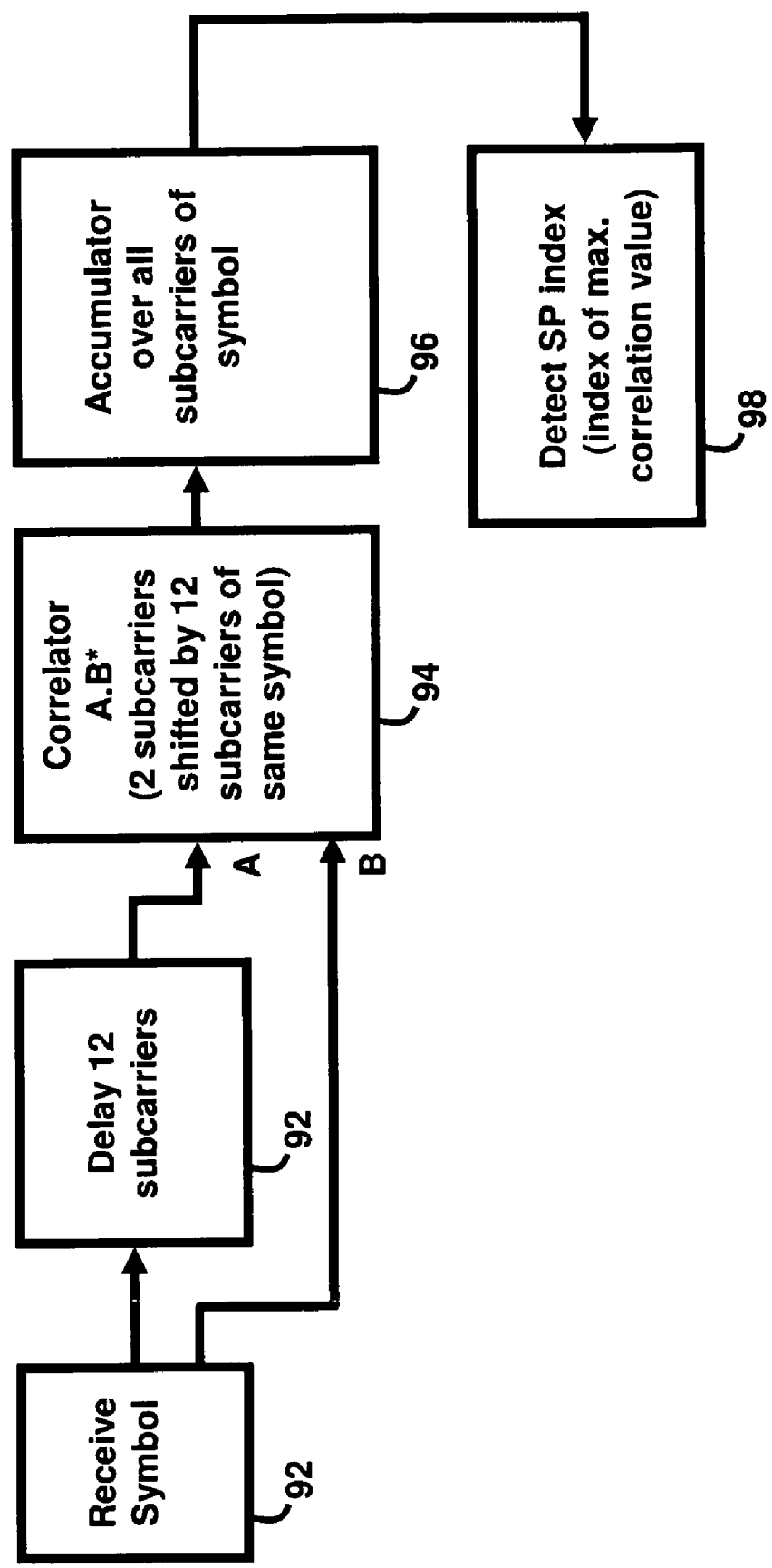

The cross-correlation technique according to the third embodiment herein is illustrated in the flowcharts of FIGS. 9(A) and 9(B). First, the subcarrier number, n, is set (91) equal to 1 with the cross-correlation, C, equal to zero. Next, the symbols are received (92). Then, a delay (93) of twelve subcarriers occurs. Upon completion of this step, a new cross-correlation (N_C) between the subcarrier n and subcarrier n+12 occurs (94). Thereafter, the process involves determining (94) whether N_C>C. If it is (Yes), then C is set (95) equal to N_C. Finally, the scattered pilot index of the highest C value is selected (68). If N_C is not greater than C (No), then the process determines (97) whether n=6816. If it is not (No), then the process reverts back to step (94). Otherwise (Yes), the scattered pilot index of the highest C is determined (98).

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
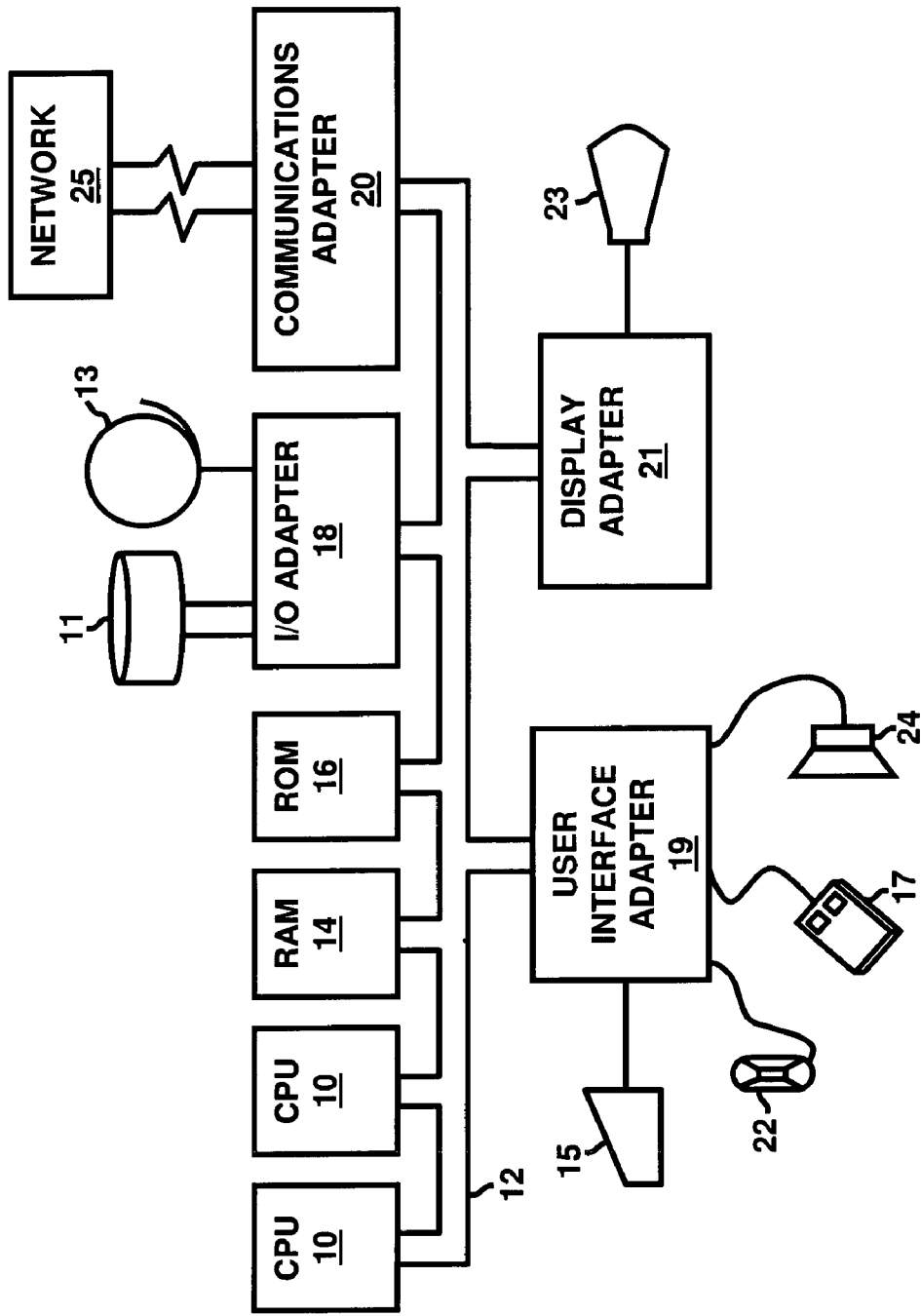
FIG. 10 illustrates a schematic diagram of a computer system according to an embodiment herein.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 11:
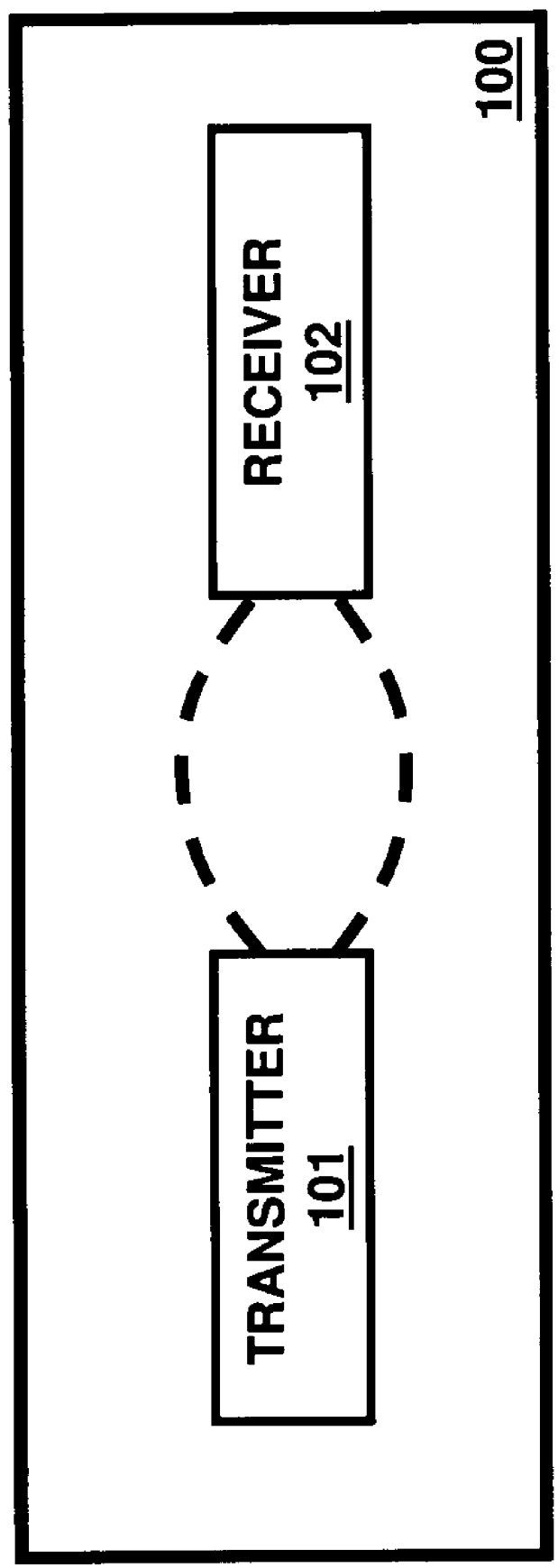
FIG. 11 is a schematic diagram of a multi-carrier transmission system according to an embodiment herein.

FIG. 11 illustrates a multi-carrier transmission system 100 in which a transmitter 101 and receiver 102 communicate wirelessly according to an embodiment herein. FIG. 12, with reference to FIGS. 1 through 11, illustrates a method for correlating scattered pilot locations in a sequence of OFDM symbols transmitted by the transmitter 101 and received by the receiver 102 in the multi-carrier transmission system 100, wherein the OFDM symbols comprise continuous pilot symbols and scattered pilot symbols, and wherein the method comprises studying (105) the estimated data of Doppler spread and channel length effects. Next, determining (106) whether the channel length is long and the Doppler spread is small. If Yes, then proceed to step (41) of FIG. 4(A). If No, then determining (107) whether the channel length is short and the Doppler spread is large. If Yes, then proceed to step (91) of FIG. 9(A). If No, then proceed to step (61) of FIG. 6(A).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for correlating scattered pilot locations in a sequence of orthogonal-frequency-division-multiplexing (OFDM) symbols transmitted by a transmitter and received by a receiver in a multi-carrier transmission system, said OFDM symbols comprising continuous pilot symbols and scattered pilot symbols, said method comprising:

mapping pilot locations comprising pilot symbols having predetermined known values, wherein said pilot symbols are positioned among data subcarriers in time and frequency dimensions consisting of received pilot symbols and having a predetermined position pattern in said time and frequency dimensions, wherein said predetermined position pattern comprises a finite number of sub-position patterns each corresponding to positions of said pilot symbols;

estimating a Doppler spread in a frequency spectrum between said transmitter and said receiver in said multi-carrier transmission system;

estimating a channel length of a set of channel paths received at said receiver;

providing a predetermined method of correlating said scattered pilot locations in said sequence of OFDM symbols; and said receiver automatically selecting said predetermined method of correlating said scattered pilot locations in said sequence of OFDM symbols based only on the estimating processes, wherein the selecting process comprises:

grouping a range of all pilot symbols located in a single subcarrier corresponding to a dynamic time dimension and a single frequency dimension, wherein said range comprises all pilot symbols located between and including a first received scattered pilot symbol and a last received scattered pilot symbol received in a single subcarrier;

buffering said range of all pilot symbols located in a single subcarrier;

disregarding a change in subcarrier values across said range of all pilot symbols located in a single subcarrier;

creating a graphical pilot correlation sequence corresponding to the buffered range of all pilot symbols located in a single subcarrier;

locating peaks in said pilot correlation sequence; and identifying said peaks as scattered pilot symbol locations.

2. The method of claim 1, wherein said multi-carrier transmission system comprises a Digital Video Broadcasting-Handheld (DVB-H) system.

3. The method of claim 1, wherein said range of all pilot symbols located in a single subcarrier equals four pilot symbols.

4. The method of claim 1, wherein said OFDM symbols are received in a slow fading channel.

5. The method of claim 1, wherein said buffering of said range of all pilot symbols located in a single subcarrier comprises buffering four received OFDM symbols.

6. A method comprising:

providing orthogonal-frequency-division-multiplexing (OFDM) symbols comprising continuous pilot symbols and scattered pilot symbols;

mapping pilot locations comprising pilot symbols having predetermined known values, wherein said pilot symbols are positioned among data subcarriers in time and frequency dimensions comprising received pilot symbols and having a predetermined position pattern in said time and frequency dimensions, wherein said predetermined position pattern comprises a finite number of sub-position patterns each corresponding to positions of said pilot symbols;

estimating a Doppler spread in a frequency spectrum in a multi-carrier transmission system;

estimating a channel length of a set of channel paths;

providing a predetermined method of correlating said scattered pilot locations in said sequence of OFDM symbols; and automatically selecting said predetermined method of correlating said scattered pilot locations in said sequence of OFDM symbols based only on the estimating processes, wherein the selecting process comprises:

grouping a range of all pilot symbols located in a single subcarrier corresponding to a dynamic time dimension and a single frequency dimension, wherein said range comprises all pilot symbols located between and including a first received scattered pilot symbol and a last received scattered pilot symbol received in a single subcarrier;

buffering said range of all pilot symbols located in a single subcarrier;

disregarding a change in subcarrier values across said range of all pilot symbols located in a single subcarrier;

creating a graphical pilot correlation sequence corresponding to the buffered range of all pilot symbols located in a single subcarrier;

locating peaks in said pilot correlation sequence; and identifying said peaks as scattered pilot symbol locations.

7. The method of claim 6, wherein said multi-carrier transmission system comprises a Digital Video Broadcasting-Handheld (DVB-H) system.

8. The method of claim 6, wherein said range of all pilot symbols located in a single subcarrier equals four pilot symbols.

9. The method of claim 6, wherein said OFDM symbols are received in a slow fading channel.

10. The method of claim 6, wherein said buffering of said range of all pilot symbols located in a single subcarrier comprises buffering four received OFDM symbols.

11. A method for correlating scattered pilot locations in a sequence of orthogonal-frequency-division-multiplexing (OFDM) symbols received by a receiver in a multi-carrier transmission system, said OFDM symbols comprising continuous pilot symbols and scattered pilot symbols, said method comprising:

mapping pilot locations comprising pilot symbols having predetermined known values, wherein said pilot symbols are positioned among data subcarriers in time and frequency dimensions comprising received pilot symbols and having a predetermined position pattern in said time and frequency dimensions, wherein said predetermined position pattern comprises a finite number of sub-position patterns each corresponding to positions of said pilot symbols;

estimating a Doppler spread in a frequency spectrum in said multi-carrier transmission system;

estimating a channel length of a set of channel paths received at said receiver;

providing a plurality of predetermined methods of correlating said scattered pilot locations in said sequence of OFDM symbols; and automatically selecting one of said plurality of predetermined methods of correlating said scattered pilot locations in said sequence of OFDM symbols based only on the estimating processes, wherein the selecting process comprises:
grouping a range of all pilot symbols located in a single subcarrier corresponding to a dynamic time dimension and a single frequency dimension, wherein said range comprises all pilot symbols located between and including a first received scattered pilot symbol and a last received scattered pilot symbol received in a single subcarrier;
buffering said range of all pilot symbols located in a single subcarrier;
disregarding a change in subcarrier values across said range of all pilot symbols located in a single subcarrier;
creating a graphical pilot correlation sequence corresponding to the buffered range of all pilot symbols located in a single subcarrier;
locating peaks in said pilot correlation sequence; and
identifying said peaks as scattered pilot symbol locations.

12. The method of claim 11, wherein said multi-carrier transmission system comprises a Digital Video Broadcasting-Handheld (DVB-H) system.

13. The method of claim 11, wherein said range of all pilot symbols located in a single subcarrier equals four pilot symbols.

14. The method of claim 11, wherein said OFDM symbols are received in a slow fading channel.

15. The method of claim 11, wherein said buffering of said range of all pilot symbols located in a single subcarrier comprises buffering four received OFDM symbols.

* * * * *